(12) United States Patent
Chen et al.

(10) Patent No.: US 11,556,369 B2
(45) Date of Patent: Jan. 17, 2023

(54) VIRTUAL MACHINE DEPLOYMENT METHOD AND OMM VIRTUAL MACHINE

(71) Applicant: HUAWEI TECHNOLOGIES CO., LTD., Guangdong (CN)

(72) Inventors: Feifei Chen, Xi'an (CN); Xiaodong Zhang, Xi'an (CN); Shaohe Cai, Shenzhen (CN); Xuefeng Lu, Xi'an (CN); Guangrui You, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 446 days.

(21) Appl. No.: 16/710,261

(22) Filed: Dec. 11, 2019

(65) Prior Publication Data

US 2020/0110631 A1     Apr. 9, 2020

Related U.S. Application Data

(63) Continuation of application No. PCT/CN2018/089441, filed on Jun. 1, 2018.

(30) Foreign Application Priority Data

Jun. 12, 2017   (CN) .......................... 201710438481.8

(51) Int. Cl.
   *G06F 9/455* (2018.01)
   *G06F 8/60* (2018.01)

(52) U.S. Cl.
   CPC ............ *G06F 9/45558* (2013.01); *G06F 8/60* (2013.01); *G06F 2009/45562* (2013.01); *G06F 2009/45595* (2013.01)

(58) Field of Classification Search
   CPC .................. G06F 9/45558; G06F 8/60; G06F 2009/45562; G06F 2009/45595
   See application file for complete search history.

(56) References Cited

U.S. PATENT DOCUMENTS

| 2012/0246645 A1 | 9/2012 | Iikura et al. |
| 2013/0031559 A1* | 1/2013 | Alicherry ............. G06F 9/5077 718/104 |

(Continued)

FOREIGN PATENT DOCUMENTS

| CN | 104301404 A | 1/2015 |
| CN | 104468688 A | 3/2015 |

(Continued)

OTHER PUBLICATIONS

International Search Report for PCT/CN2018/089441 dated Sep. 3, 2018, 4 pages.

(Continued)

*Primary Examiner* — Jacob D Dascomb

(57) ABSTRACT

This application describes a virtual machine deployment method and an operation and maintenance management (OMM) virtual machine. The method includes: obtaining, by an OMM virtual machine, a quantity and a specification of service virtual machines created in virtual network function application software to which the OMM virtual machine belongs; and determining, by the OMM virtual machine based on load that needs to be carried by the application software and the quantity and the specification of the service virtual machines, a module to be configured for each service virtual machine. The described implementations avoid or reduce waste of virtual machine resources.

13 Claims, 3 Drawing Sheets

(56) References Cited

U.S. PATENT DOCUMENTS

| | | | |
|---|---|---|---|
| 2014/0337834 A1 | 11/2014 | Adogla | |
| 2014/0344810 A1* | 11/2014 | Wang | G06F 9/5083 |
| | | | 718/1 |
| 2019/0073235 A1* | 3/2019 | Hoshino | G06F 11/00 |

FOREIGN PATENT DOCUMENTS

| | | |
|---|---|---|
| CN | 104917805 A | 9/2015 |
| CN | 104954220 A | 9/2015 |
| CN | 105553714 A | 5/2016 |
| CN | 105718299 A | 6/2016 |
| CN | 105812414 A | 7/2016 |
| CN | 106161173 A | 11/2016 |
| WO | 2016107149 A1 | 7/2016 |

OTHER PUBLICATIONS

Chinese Notice of Allowance for Application No. 201710438481.8 dated Nov. 17, 2021, 4 pages.
Chinese Office Action dated Mar. 1, 2021 for Application No. 201710438481.8, 8 pages.

* cited by examiner

VIRTUAL MACHINE DEPLOYMENT METHOD AND OMM VIRTUAL MACHINE

CROSS-REFERENCE TO RELATED APPLICATIONS

This application is a continuation of International Application No. PCT/CN2018/089441, filed on Jun. 1, 2018, which claims priority to Chinese Patent Application No. 201710438481.8, filed on Jun. 12, 2017, the disclosures of the aforementioned applications are hereby incorporated by reference in their entireties.

TECHNICAL FIELD

This application relates to the field of computer technologies, and in particular, to a virtual machine deployment method and an operation and maintenance management (OMM) virtual machine.

BACKGROUND

In a network functions virtualization (NFV) telecom cloud system, a network functions virtualization IaaS (NFVI) provides an interface defined by a virtual machine specification for management and orchestration (MANO), so that each virtualized network function (VNF) can define, based on different capacities, the virtual machine specification and a module deployed on a virtual machine. For example, an MRPHRU virtual machine specification defined by a VNF controlled by media is 6vCPU+12GMem+10GDisk configured with a high-speed routing unit (HRU), a protocol control unit (PCU), and a connection management unit (CMU). A CSRDB virtual machine specification defined by a VNF responsible for a call session control function (CSCF) is 4vCPU+28GMem+100GDisk configured with four remote distributed database (RDB) modules. In the NFV telecom cloud system, virtual machine life cycle management (e.g., application, releasing, and maintenance) and orchestration (e.g., anti-affinity and deployment) are mainly implemented by a virtualized network function manager (VNFM). A procedure for the VNFM to perform the virtual machine life cycle management for a VNF is as follows.

(1) The VNFM selects, from VNF descriptors (VNFD) supported by the VNF, a VNFD that matches a level of a project capacity of the VNF, and determines a required quantity of service virtual machines of each type, defined in the matched VNFD, and the matched VNFD defines a service virtual machine of a specific specification suitable for the VNF and a specific module that need to be configured in the service virtual machines.

(2) The VNFM creates one flavor for each type of service virtual machine defined in the matched VNFD.

(3) The VNFM creates a required service virtual machine based on the required quantity of virtual machines of each type and the flavor.

(4) After an operation and maintenance management (OMM) virtual machine is started, software required by the OMM virtual machine is installed and modules required by the OMM virtual machine are configured.

(5) The VNFM notifies VNF information of the VNF to the OMM virtual machine, and the OMM virtual machine loads, from a file transfer protocol (FTP) server based on the VNF information, a service software package and other information required by the VNF.

(6) The VNFM notifies instance information (e.g., an instance ID, a virtual machine type, and an actual virtual machine specification) of each created service virtual machine to the OMM virtual machine. The OMM virtual machine configures required modules for each created service virtual machine.

(7) The OMM virtual machine installs the required software for each created service virtual machine based on the service software package, and loads a module program and a data file for the service virtual machine based on configuration of the OMM virtual machine, to run a service module.

The inventors found that the virtual machine specification selected by the VNFM for the VNF from the VNFD in conventional systems is generally quite different from a virtual machine specification actually provided by a public cloud or a private cloud. For example, a virtual machine specification actually provided by the public cloud is 8vCPU+16GMem, but a virtual machine specification closest to the specification 8vCPU+16GMem in the VNFD is 6vCPU+12GMem. As a result, when the VNFM configures the virtual machine based on 6vCPU+12GMem, the VNFM actually selects the virtual machine with the specification 8vCPU+16GMem to provide resources, thereby causing a waste of 2vCPU+4GMem resources. Thus, in conventional systems, there is a large waste of resources.

SUMMARY

Embodiments of the present invention provide a virtual machine deployment method and an OMM virtual machine, so as to avoid a problem of a waste of virtual machine resources.

According to a first aspect, an embodiment of the present invention provides a virtual machine deployment method. The method includes: obtaining, by an OMM virtual machine, a quantity and a specification of service virtual machines created in virtual network function application software to which the OMM belongs; and determining, by the OMM virtual machine based on load that needs to be carried by the application software and the quantity and the specification of the service virtual machines, a module that needs to be configured for each service virtual machine.

By performing the foregoing operations, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

With reference to the first aspect, in a first possible implementation of the first aspect, the determining, by the OMM virtual machine based on load that needs to be carried by the application software and the quantity and the specification of the service virtual machines, a module that needs to be configured for each service virtual machine includes: determining, based on the load that needs to be carried by the application software, a type of a required module and a total quantity of modules of each type; and configuring, based on the quantity and the specification of the service virtual machines, the total quantity of modules of each type for each service virtual machine.

With reference to the first aspect or any one of the foregoing possible implementations of the first aspect, in a second possible implementation of the first aspect, resources occupied when all modules configured for a target service virtual machine run do not exceed resources represented by a specification of the target service virtual machine, and the target service virtual machine is any one of the service virtual machines.

With reference to the first aspect or any one of the foregoing possible implementations of the first aspect, in a third possible implementation of the first aspect, a difference between the resources represented by the specification of the target service virtual machine and the resources occupied when all the modules configured for the target service virtual machine run is not greater than a first preset threshold.

With reference to the first aspect or any one of the foregoing possible implementations of the first aspect, in a fourth possible implementation of the first aspect, the quantity and the specification of the service virtual machines are obtained based on a virtual machine specification supported by a cloud infrastructure system and the load that needs to be carried by the application software; and a specification of each service virtual machine is the same as the virtual machine specification supported by the cloud infrastructure system.

With reference to the first aspect or any one of the foregoing possible implementations of the first aspect, in a fifth possible implementation of the first aspect, the cloud infrastructure system supports a plurality of virtual machine specifications, and a virtual machine of each specification has a corresponding cost; and when all the service virtual machines can carry the load that needs to be carried by the application software, a total cost of all the service virtual machines is lowest or a quantity of virtual machine specifications of all the service virtual machines is less than a second preset threshold.

With reference to the first aspect or any one of the foregoing possible implementations of the first aspect, in a sixth possible implementation of the first aspect, the obtaining, by an OMM virtual machine, a quantity and a specification of service virtual machines created in virtual network function application software to which the OMM belongs includes: receiving the quantity and the specification of service virtual machines created in the application software to which the OMM belongs, sent by a deployment engine, or receiving an input quantity and specification of the service virtual machines created in the application software to which the OMM belongs.

According to a second aspect, an embodiment of the present invention provides an OMM virtual machine. The OMM virtual machine includes a processing unit. The processing unit is configured to obtain a quantity and a specification of service virtual machines created in virtual network function application software to which the OMM belongs; and the processing unit is configured to determine, based on load that needs to be carried by the application software and the quantity and the specification of the service virtual machines, a module that needs to be configured for each service virtual machine.

By running the foregoing unit, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

With reference to the second aspect, in a first possible implementation of the second aspect, that the processing unit is configured to determine, based on load that needs to be carried by the application software and the quantity and the specification of the service virtual machines, a module that needs to be configured for each service virtual machine includes: determining, based on the load that needs to be carried by the application software, a type of a required module and a total quantity of modules of each type; and configuring, based on the quantity and the specification of the service virtual machines, the total quantity of modules of each type for each service virtual machine.

With reference to the second aspect or any one of the foregoing possible implementations of the second aspect, in a second possible implementation of second first aspect, resources occupied when all modules configured for a target service virtual machine run do not exceed resources represented by a specification of the target service virtual machine, and the target service virtual machine is any one of the service virtual machines.

With reference to the second aspect or any one of the foregoing possible implementations of the second aspect, in a third possible implementation of the second aspect, a difference between the resources represented by the specification of the target service virtual machine and the resources occupied when all the modules configured for the target service virtual machine run is not greater than a first preset threshold.

With reference to the second aspect or any one of the foregoing possible implementations of the second aspect, in a fourth possible implementation of the second aspect, the quantity and the specification of the service virtual machines are obtained based on a virtual machine specification supported by a cloud infrastructure system and the load that needs to be carried by the application software; and a specification of each service virtual machine is the same as the virtual machine specification supported by the cloud infrastructure system.

With reference to the second aspect or any one of the foregoing possible implementations of the second aspect, in a fifth possible implementation of the second aspect, the cloud infrastructure system supports a plurality of virtual machine specifications, and a virtual machine of each specification has a corresponding cost; and when all the service virtual machines can carry the load that needs to be carried by the application software, a total cost of all the service virtual machines is lowest or a quantity of virtual machine specifications of all the service virtual machines is less than a second preset threshold.

With reference to the second aspect or any one of the foregoing possible implementations of the second aspect, in a sixth possible implementation of the second aspect, the processing unit is configured to obtain a quantity and a specification of service virtual machines created in virtual network function application software to which the OMM belongs includes: receiving the quantity and the specification of service virtual machines created in the application software to which the OMM belongs, sent by a deployment engine, or receiving an input quantity and specification of the service virtual machines created in the application software to which the OMM belongs.

According to a third aspect, an embodiment of the present invention provides a device. The device includes a processor and a memory, the memory is configured to store a program of an OMM virtual machine, and the processor is configured to run the program of the OMM virtual machine to perform the method procedure described in the first aspect or any possible implementation of the first aspect.

According to a fourth aspect, an embodiment of the present invention provides a storage medium. The storage medium includes a program of an OMM virtual machine, and when the program of the OMM virtual machine is run on a processor, the method described in the first aspect or any possible implementation of the first aspect is implemented.

By implementing the embodiments of the present invention, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

BRIEF DESCRIPTION OF DRAWINGS

To describe the technical solutions in the embodiments of the present invention or in the background more clearly, the following briefly describes the accompanying drawings for describing the embodiments or the background.

DESCRIPTION OF EMBODIMENTS

The embodiments of the present invention are described below with reference to the accompanying drawings.

Figure 1:
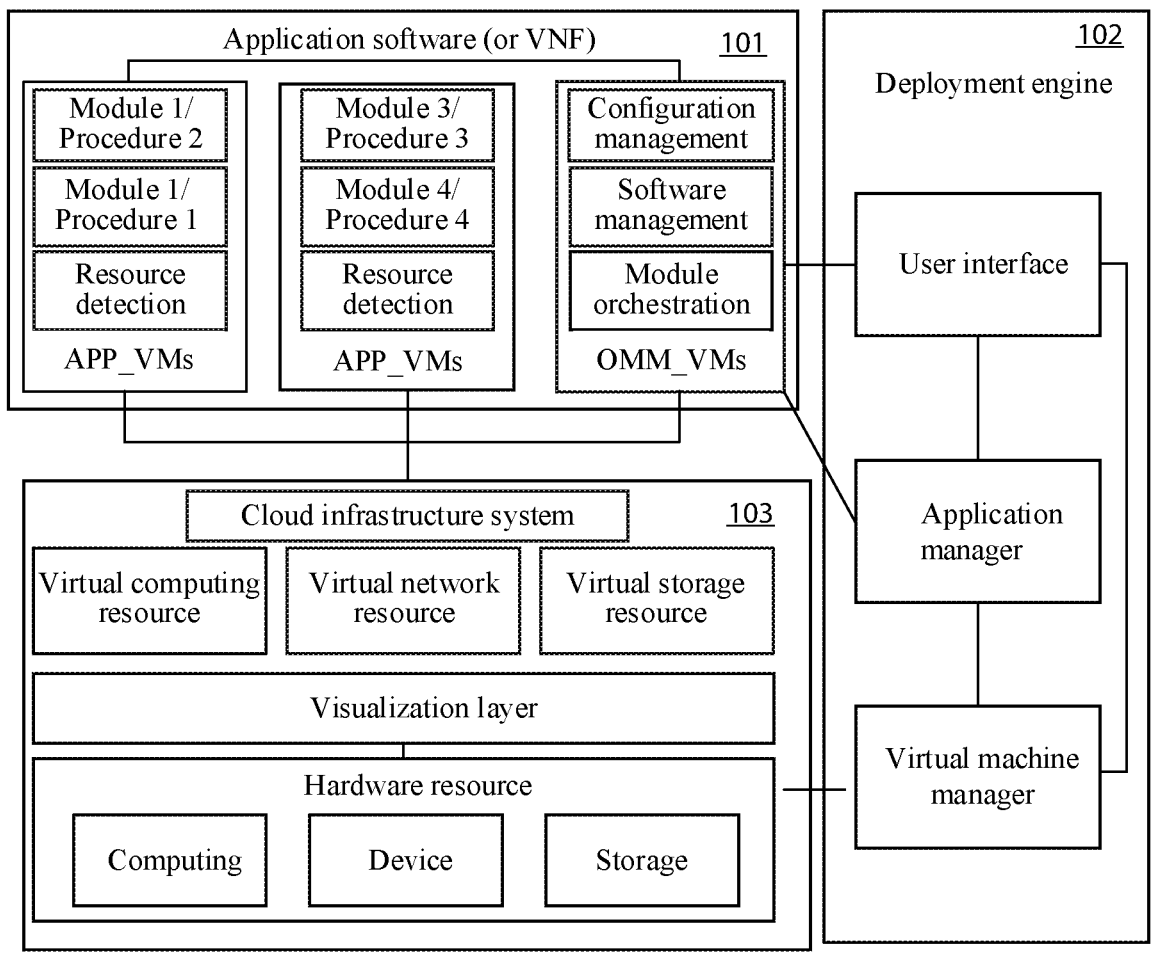
FIG. 1 is a schematic structural diagram of a cloud application system according to an embodiment of the present invention.

FIG. 1 is a schematic structural diagram of a cloud application system 10 according to an embodiment of the present invention. The system 10 includes application software 101, a deployment engine 102, and a cloud infrastructure system 103. The application software 101 may also be referred to as a VNF, an application, or may have another name. The deployment engine 102 may also be referred to as a deployment tool or may have another name. The cloud infrastructure system 103 may also be referred to as a cloud system or an infrastructure as a service (IaaS). The cloud infrastructure system 103 may be a public cloud or a private cloud. The cloud infrastructure system 103 provides a virtual machine life cycle management interface for the deployment engine 102, and provides resources required for running a virtual machine deployed on the application software 101. The deployment engine 102 is configured to create and manage a virtual machine function required by the application software 101, by using an application programming interface (Application Programming Interface, API) provided by the cloud infrastructure system 103, and can provide a certain virtual machine installation and deployment capability for the application software, for example, a configuration information transfer capability (such as, for example, a configuration file and/or a key_value) and an intrusive software installation capability. The deployment engine may include a portal (also referred to as a user interface), an app manager (application manager), a VM manager (virtual machine manager), and the like. The portal is used by a user to perform a deployment and management operation (for example, uploading an application system description file and a software package, and managing a deployment process). The app manager is used to parse an application system description file and execute a deployment task for the application software. The VM manager is used to interconnect to the cloud infrastructure system to implement the VM life cycle management. In addition, the deployment engine may also be a VNFM of the cloud application system or another application deployment tool. The deployment engine is used as an example for the following description. The virtual machine in the application software can include an OMM virtual machine (for example, an OMM_VM, which is an operation and maintenance component of the application software and provides an operation and maintenance management capability for the application software) and a service virtual machine (for example, an APP_VM, which is a service component of the application software and provides an actual software service capability). OMM mirroring is installed on the OMM virtual machine, and can configure the service virtual machine, so that the service virtual machine can provide a service. The service virtual machine is configured with modules (for example, module 1 and module 2) for running procedures (for example, procedure 1 and procedure 2). The OMM virtual machine has a configuration management function (configured to configure the service virtual machine), a software management function (configured to manage software that needs to be installed on the service virtual machine), and a module orchestration function. The service virtual machine has a resource detection function that can be configured to detect a specification of the service virtual machine and report the specification of the service virtual machine to the OMM virtual machine, the module orchestration function of the OMM virtual machine performs, based on the specification reported by each service VM, calculation to determine which modules each virtual machine needs.

Figure 2:
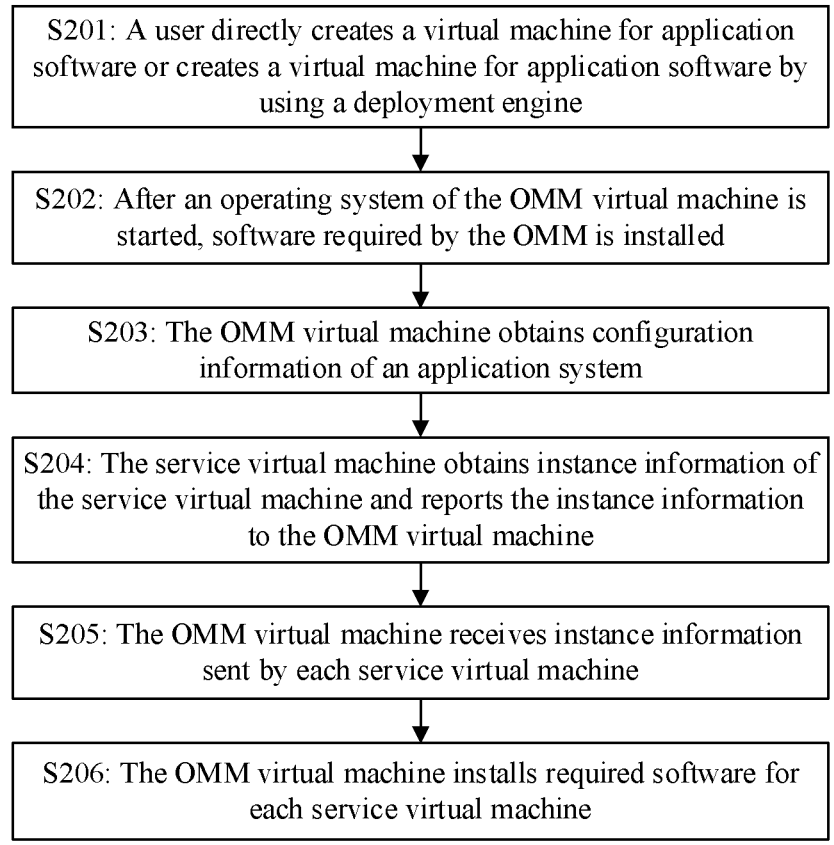
FIG. 2 is a schematic flowchart of a virtual machine deployment method according to an embodiment of the present invention.

FIG. 2 is a schematic flowchart of a virtual machine deployment method according to an embodiment of the present invention. The method may be implemented based on the cloud application system 10 or another system. The method includes but is not limited to the following steps.

Step S201: A user either directly creates a virtual machine for application software, or creates a virtual machine for application software by using a deployment engine.

Specifically, when the user directly configures the virtual machine, the user needs to manually configure much of the content. When the virtual machine is created by using the deployment engine, the user only needs to perform simple configurations on the deployment engine, and then the deployment engine performs other configuration. The deployment engine can be used to create the virtual machine for the application software, thereby improving a virtual machine creation speed and reducing user operations such as manual operations.

In addition, a quantity of the created virtual machines are also obtained through calculation based on load that needs to be carried by the application software. The following describes an example technique for calculating the quantity of virtual machines that need to be created. First, the load that needs to be carried by the application software and a virtual machine specification supported by the cloud infrastructure system (for example, a public cloud or a private cloud) need to be obtained. For example, the load may be a supported user capacity or a service capacity (for example, a chat system supporting one million users to be online at the same time, a conference system supporting two million users to be called at the same time, or a ticket system operated by one million users online). The virtual machine specification generally includes information such as a quantity of CPU cores, a memory size, and a hard disk size. For example, the virtual machine specification supported by the cloud infrastructure system includes 8vCPU+16GMeM, and the cloud infrastructure system supports (or "may provide") one or more virtual machine specifications.

Based on the two types of information (other information may also be used), a quantity of virtual machines required for carrying the load are calculated. The virtual machine used to carry the load may be referred to as a service virtual machine. An optional calculation manner is: First, a type of required modules and a total quantity of modules of each type are determined based on the load that needs to be carried by the application software. For example, the module may include a DPU module, a BSU module, a CDB module, an RDB module, an SCU module, or the like. It is assumed that the DPU, BSU, CDB, RDB, and SCU modules are required, a total quantity of DPU modules, a total quantity of BSU modules, a total quantity of CDB modules, a total quantity of RDB modules, and a total quantity of SCU modules also need to be determined. Then, the quantities of the required service virtual machines are calculated by using a preset orchestration algorithm based on the types of the required modules, the total quantity of modules of each type, and the virtual machine specification supported by the cloud infrastructure system. A specification of each service virtual machine is the same as the virtual machine specification supported by the cloud infrastructure system. For example, if a quantity of required service virtual machines is four, specifications of the four service virtual machines are all the same as the specification supported by the cloud infrastructure system. However, the specifications of the four service VMs may be different.

When the cloud infrastructure system supports a plurality of virtual machine specifications, a virtual machine of each specification has a corresponding cost. While ensuring that all the service virtual machines can carry the load that needs to be carried by the application software, the orchestration algorithm also needs to minimize a total cost of all the service virtual machines, for example, by selecting a solution with a lowest cost. In addition, the virtual machine type may be further used as a constraint for calculation by using the orchestration algorithm. For example, it may be required that a quantity of virtual machine specifications of all service virtual machines be less than a second preset threshold. For example, a specification of some of all the service virtual machines is 8vCPU+16GMem, and a specification of the other service virtual machines is 4vCPU+8GMem. Therefore, the quantity of the specifications of all the service virtual machines is two, in other words, there are two specifications. The second preset threshold is a preset value used for reference and comparison, for example, may be set to 1, 2, 3, or another value. It may be understood that, the total cost of all the service virtual machines and the quantity of the specifications of all service virtual machines may be used as a constraint for calculating the quantity of the required service virtual machines. When both the two constraints exist and the two constraints cannot be met at the same time, one of the constraints can be loosened as required.

For ease of understanding, the following uses some data for description. It is assumed that after information of one million load is input into a configuration tool (which may be deployed on application software), the configuration tool outputs a quantity of required modules: four DPU modules, four BSU modules, two CDB modules, four RDB modules, and 12 SCU modules. Then, the virtual machine specification 8vCPU+16GMem supported by the cloud infrastructure system is inputted into the configuration tool, and the configuration tool needs to calculate, according to a preset orchestration algorithm, the quantity of the service virtual machines of the specification 8vCPU+16GMem required when the modules are allocated to the service virtual machines of the specification 8vCPU+16GMem. The quantity of the service virtual machines should be minimized. A result obtained by using the orchestration algorithm is shown in Table 1.

TABLE 1

|  | RDB | SCU | SCU | SCU | CDB | BSU | DPU |
|---|---|---|---|---|---|---|---|
| VM1 |  |  |  |  |  |  |  |
| CPU = 8 | 1 | 1 | 1 | 1 | 1 | 1 | 2 |
| Mem = 16 − 2 | 5 | 1.5 | 1.5 | 1.5 | 1.5 | 1 | 2 |
| VM2 |  |  |  |  |  |  |  |
| CPU = 8 | 1 | 1 | 1 | 1 | 1 | 1 | 2 |
| Mem = 16 − 2 | 5 | 1.5 | 1.5 | 1.5 | 1.5 | 1 | 2 |

|  | RDB | SCU | SCU | SCU | BSU | DPU |
|---|---|---|---|---|---|---|
| VM3 |  |  |  |  |  |  |
| CPU = 8 | 1 | 1 | 1 | 1 | 1 | 2 |
| Mem = 16 − 2 | 5 | 1.5 | 1.5 | 1.5 | 1 | 2 |
| VM4 |  |  |  |  |  |  |
| CPU = 8 | 1 | 1 | 1 | 1 | 1 | 2 |
| Mem = 16 − 2 | 5 | 1.5 | 1.5 | 1.5 | 1 | 2 |

Table 1 shows four virtual machines which are a virtual machine VM1, a virtual machine VM2, a virtual machine VM3, and a virtual machine VM4. Because the four virtual machines are designed based on the virtual machine specification 8vCPU+16GMem supported by the cloud infrastructure system, a CPU occupied by a module in any one of the four virtual machines has a maximum of eight cores, and a memory occupied by a module in any one of the four virtual machines does not exceed (16−2)=14G. The subtracted 2G is reserved for another basic module (for example, an operating system and a virtual machine management module). In actual application, the memory size 2G may be another value. As shown in FIG. 1, one RDB module can occupy one-core CPU and 5G memory, one SCU module can occupy one-core CPU and 1.5G memory, one CDB module can occupy one-core CPU and 1.5G memory, one BSU module can occupy one-core CPU and 1G memory, and one DPU module can occupy two-core CPU and 2G memory. The virtual machine VM1 can be configured with one RDB module, three SCU modules, one CDB module, one BSU module, and one DPU module. The virtual machine VM2 can be configured with one RDB module, three SCU modules, one CDB module, one BSU module, and one DPU module. The virtual machine VM3 can be configured with one RDB module, three SCU modules, one BSU module, and one DPU module. The virtual machine VM4 can be configured with one RDB module, three SCU modules, one BSU module, and one DPU module.

The foregoing example describes a manner of calculating the quantity of service virtual machines. A manner of obtaining the quantity and the specification of the OMM virtual machines is not limited herein. Optionally, the manner in conventional systems may be used to determine the quantity and the specification of the OMM virtual machines. The virtual machines created for the application software include the created service virtual machines and the OMM virtual machine. The quantity and specification of the service virtual machines that need to be created and the quantity and specification of the OMM virtual machines that need to be created are described in the foregoing.

Step S202: After an operating system of the OMM virtual machine is started, software required by the OMM is installed.

Specifically, after the software is installed on the OMM virtual machine, information (e.g., CPU+memory+disk and others) of the OMM virtual machine is read to obtain a specification of the OMM virtual machine, and then the specification of the OMM virtual machine is updated based on the obtained specification. For example, the specification of the OMM virtual machine read is 8vCPU+16GMem, and the OMM virtual machine updates the specification of the OMM virtual machine to the specification 8vCPU+16GMem.

Step S203: The OMM virtual machine obtains configuration information of the application system.

Specifically, the OMM virtual machine may request the application system configuration from the deployment engine (or the deployment engine sends the application system configuration to the OMM virtual machine in a data transmission manner). The configuration information of the application system may include basic configuration of the application system, for example, a system ID, a system name, a maintenance entrance IP, and load that can be carried. The information may further indicate software, modules, and the like that may be used by a service that needs to be carried by the application system. The OMM virtual machine can configure the system based on the information and download software that may be used by the application system from a deployment engine server or a file server matching the deployment engine. It should be noted that the OMM virtual machine may determine, based on the load that can be carried by the application software, a module that is required by the application system. For example, it is determined, based on one million load that can be carried by the application system, that the application system needs four DPU modules, four BSU modules, two CDB modules, four RDB modules, and 12 SCU modules.

Step S204: The service virtual machine obtains instance information of the service virtual machine and reports the instance information to the OMM virtual machine.

Specifically, after being started, each created service virtual machine obtains instance information of the created service virtual machine. For example, each service virtual machine may obtain a specification of the service virtual machine (including, for example, CPU, memory, and disk information and the like). An address of the OMM virtual machine is preconfigured in each service virtual machine. Therefore, each service virtual machine may send the instance information of the service virtual machine to the OMM virtual machine by using the address of the OMM virtual machine.

Step S205: The OMM virtual machine receives instance information sent by each service virtual machine.

Specifically, because the OMM virtual machine receives the instance information sent by each service virtual machine, the OMM virtual machine may learn a total quantity of service virtual machines, and the OMM virtual machine may learn a specification of each service virtual machine based on the instance information sent by each service virtual machine. In addition, in another step, the OMM virtual machine determines, through calculation based on the load that needs to be carried by the application software, a type of a module required by the application software and a total quantity of modules of each type, and the OMM virtual machine may allocate various types of modules to the created service virtual machines by using the foregoing preset orchestration algorithm, so as to obtain the module that needs to be configured for each service virtual machine. For example, it is assumed that the OMM virtual machine requires four DPU modules, four BSU modules, two CDB modules, four RDB modules, and 12 SCU modules based on one million load. It is determined that there are four service virtual machines (assuming that the four service virtual machines are VM1, VM2, VM3, and VM4), and a specification of each service virtual machine is 8vCPU+16GMem. Therefore, by using the orchestration algorithm, the OMM virtual machine obtains an allocation result shown in Table 1.

The OMM virtual machine configures a required module for each virtual machine after learning the module that needs to be configured for each virtual machine. Resources occupied when all modules configured for a target service virtual machine run do not exceed resources represented by a specification of the target service virtual machine, and the target service virtual machine is any one of the service virtual machines. Optionally, a difference between the resources represented by the specification of the target service virtual machine and the resources occupied when all the modules configured for the target service virtual machine run is not greater than a first preset threshold. The first preset threshold is a preset value used for reference and comparison.

Further, the OMM virtual machine determines, based on the module configured for each service virtual machine, software that needs to be installed on each service virtual machine. By using Table 1 as an example, the service virtual machine VM1 needs to install software that matches the DPU module, the BSU module, the CDB module, the RDB, and the SCU module. The service virtual machine VM2 needs to install software that matches the DPU module, BSU module, CDB module, RDB module, and SCU module. The service virtual machine VM3 needs to install software that matches the DPU module, BSU module, RDB module, and SCU module. The service virtual machine VM4 needs to install software that matches the DPU module, BSU module, RDB module, and SCU module.

Step S206: The OMM virtual machine installs required software for each service virtual machine.

Specifically, after installing software for each service virtual machine, the OMM virtual machine loads configuration information for each service virtual machine, and starts each module of each service virtual machine. It may be understood that because all software required by the application software is downloaded, the downloaded software may be selectively installed on each service virtual machine herein according to a specific requirement of each service virtual machine.

Optionally, the OMM virtual machine notifies the deployment engine of information about the module configured for each service virtual machine and information about the software that needs to be installed for each service virtual machine. The deployment engine performs capacity expansion on each service virtual machine and installs required software for each service virtual machine based on the received information. Then, the OMM virtual machine loads data configuration for each service virtual machine and starts each module of each service virtual machine.

In the method shown in FIG. 2, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

The method in the embodiments of the present invention is described above in detail, and an apparatus in the embodiments of the present invention is provided below.

Figure 3:
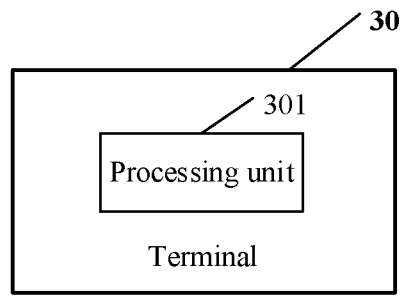
FIG. 3 is a schematic structural diagram of an OMM virtual machine according to an embodiment of the present invention.

FIG. 3 is a schematic structural diagram of an OMM virtual machine 30 according to an embodiment of the present invention. The OMM virtual machine 30 may include a processing unit 301. The processing unit 301 is configured to obtain a quantity and a specification of service virtual machines created in virtual network function application software to which the OMM belongs; and the processing unit 301 is configured to determine, based on load that needs to be carried by the application software and the quantity and the specification of the service virtual machines, a module that needs to be configured for each service virtual machine.

By running the foregoing unit, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

In an optional solution, that the processing unit is configured to determine, based on load that needs to be carried by the application software and the quantity and the specification of the service virtual machines, a module that needs to be configured for each service virtual machine includes: determining, based on the load that needs to be carried by the application software, a type of a required module and a total quantity of modules of each type; and configuring, based on the quantity and the specification of the service virtual machines, the total quantity of modules of each type for each service virtual machine.

In still another optional solution, resources occupied when all modules configured for a target service virtual machine run do not exceed resources represented by a specification of the target service virtual machine, and the target service virtual machine is any one of the service virtual machines.

In still another optional solution, a difference between the resources represented by the specification of the target service virtual machine and the resources occupied when all the modules configured for the target service virtual machine run is not greater than a first preset threshold.

In still another optional solution, the quantity and the specification of the service virtual machines are obtained based on a virtual machine specification supported by a cloud infrastructure system and the load that needs to be carried by the application software; and a specification of each service virtual machine is the same as the virtual machine specification supported by the cloud infrastructure system.

In still another optional solution, the cloud infrastructure system supports a plurality of virtual machine specifications, and a virtual machine of each specification has a corresponding cost; and when all the service virtual machines can carry the load that needs to be carried by the application software, a total cost of all the service virtual machines is lowest or a quantity of virtual machine specifications of all the service virtual machines is less than a second preset threshold.

In still another optional solution, that the processing unit is configured to obtain a quantity and a specification of service virtual machines created in virtual network function application software to which the OMM belongs includes: receiving the quantity and the specification of service virtual machines created in the application software to which the OMM belongs, sent by a deployment engine, or receiving an input quantity and specification of the service virtual machines created in the application software to which the OMM belongs.

It should be noted that, for implementation of each unit, corresponding description of the method embodiment shown in FIG. 2 may be referred to.

In the OMM virtual machine 30 described in FIG. 3, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

Figure 4:
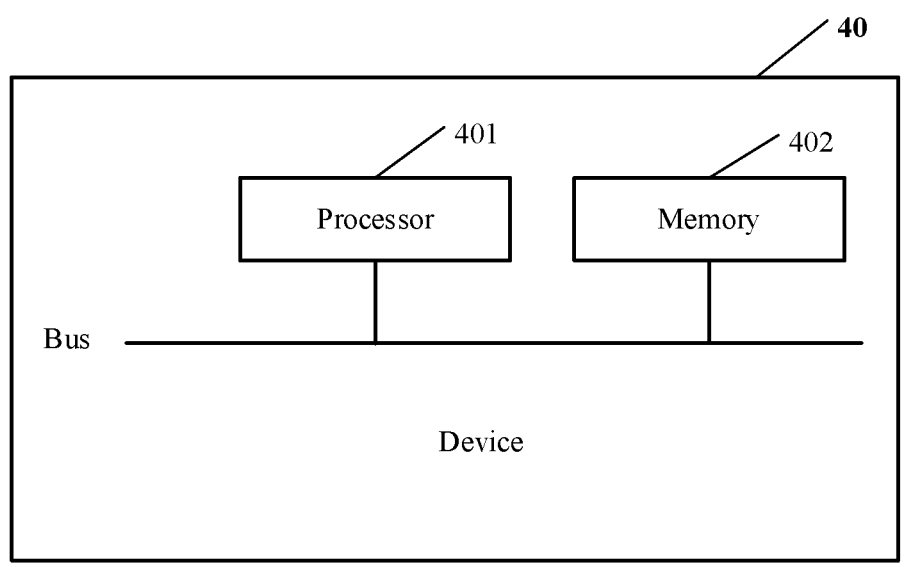
FIG. 4 is a schematic structural diagram of a device according to an embodiment of the present invention.

FIG. 4 is a device 40 according to an embodiment of the present invention. The device 40 includes a processor 401 and a memory 402. The processor 401 and the memory 402 are connected to each other by using a bus.

The memory 402 includes but is not limited to a random access memory (RAM), a read-only memory (ROM), an erasable programmable read-only memory (EPROM), or a compact disc read-only memory (CD-ROM). The storage device 402 is configured to store a program of the OMM virtual machine.

The processor 401 may be one or more central processing units (CPU). When the processor 401 is one CPU, the CPU may be a single-core CPU or a multi-core CPU.

The processor 401 in the device 40 is configured to read a program of the OMM virtual machine stored in the memory 402, and perform the following operations: obtaining a quantity and a specification of service virtual machines created in virtual network function application software to which the OMM belongs; and determining, based on load that needs to be carried by the application software and the quantity and the specification of the service virtual machines, a module that needs to be configured for each service virtual machine.

In an optional solution, the determining, based on load that needs to be carried by the application software and the quantity and the specification of the service virtual machines, a module that needs to be configured for each service virtual machine includes: determining, based on the load that needs to be carried by the application software, a type of a required module and a total quantity of modules of each type; and configuring, based on the quantity and the specification of the service virtual machines, the total quantity of modules of each type for each service virtual machine.

In still another optional solution, resources occupied when all modules configured for a target service virtual machine run do not exceed resources represented by a specification of the target service virtual machine, and the target service virtual machine is any one of the service virtual machines.

In still another optional solution, a difference between the resources represented by the specification of the target service virtual machine and the resources occupied when all the modules configured for the target service virtual machine run is not greater than a first preset threshold.

In still another optional solution, the quantity and the specification of the service virtual machines are obtained based on a virtual machine specification supported by a cloud infrastructure system and the load that needs to be carried by the application software; and a specification of each service virtual machine is the same as the virtual machine specification supported by the cloud infrastructure system.

In still another optional solution, the cloud infrastructure system supports a plurality of virtual machine specifications, and a virtual machine of each specification has a corresponding cost; and when all the service virtual machines can carry the load that needs to be carried by the application software, a total cost of all the service virtual machines is lowest or a quantity of virtual machine specifications of all the service virtual machines is less than a second preset threshold.

In still another optional solution, the obtaining a quantity and a specification of service virtual machines created in virtual network function application software to which the OMM belongs includes: receiving the quantity and the specification of service virtual machines created in the application software to which the OMM belongs, sent by a deployment engine, or receiving an input quantity and specification of the service virtual machines created in the application software to which the OMM belongs.

It should be noted that, for implementation of each operation, corresponding description of the method embodiment shown in FIG. 2 may be referred to.

In the device 40 described in FIG. 4, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

In conclusion, by implementing the embodiments of the present invention, different from that in conventional systems, the specification of the created service virtual machine is not selected from specifications predefined in a VNFD, but a virtual machine specification supported by a cloud infrastructure system is directly used. Then, a module required by the service virtual machine is configured based on the specification of the service virtual machine, so that the service virtual machine can run normally. This avoids a problem of a waste of virtual machine resources provided by the cloud infrastructure system caused by mismatch between the specification of the service virtual machine and the virtual machine specification supported by the cloud infrastructure system.

A person of ordinary skill in the art may understand that all or some of the processes of the methods in the embodiments may be implemented by a computer program instructing relevant hardware. The program may be stored in a non-transitory computer readable storage medium. When the program runs, the processes of the methods in the embodiments are performed. The foregoing storage medium includes any medium that can store program code, for example, a ROM, a RAM, a magnetic disk, or an optical disc.

What is claimed is:

1. A virtual machine deployment method, comprising:
obtaining, by an operation and maintenance management (OMM) virtual machine and based on information received from respective service virtual machines created in virtual network function application software to which the OMM virtual machine belongs, a quantity and a specification of said service virtual machines, wherein a specification of a service virtual machine indicates at least CPU information, memory information and hard disk information associated with the service virtual machine; and
determining, by the OMM virtual machine and based on a load to be carried by the application software and the quantity and the specification of the service virtual machines, a plurality of modules to be configured for each of the service virtual machines,
wherein the determining comprises:
determining, based on the load, a type of the module of each of the plurality of modules and a total quantity of modules of each type; and
configuring, based on the quantity and the specification of the service virtual machines, the total quantity of modules of each type for each of the service virtual machines.

2. The method according to claim 1, wherein resources occupied when all modules configured for a target service virtual machine run do not exceed resources represented by a specification of the target service virtual machine, and the target service virtual machine is any one of the service virtual machines.

3. The method according to claim 1, wherein a difference between the resources represented by the specification of the target service virtual machine and the resources occupied when all the modules configured for the target service virtual machine run is not greater than a first preset threshold.

4. The method according to claim 1, wherein the quantity and the specification of the service virtual machines are obtained based on a virtual machine specification supported by a cloud infrastructure system and the load; and a specification of each service virtual machine is the same as the virtual machine specification supported by the cloud infrastructure system.

5. The method according to claim 4, wherein the cloud infrastructure system supports a plurality of virtual machine specifications, and a virtual machine of each specification has a corresponding cost; and when all the service virtual machines can carry the load, a total cost of all the service virtual machines is lowest or a quantity of virtual machine specifications of all the service virtual machines is less than a second preset threshold.

6. The method according to claim 1, wherein the obtaining comprises:
receiving the quantity and the specification of service virtual machines created in the application software to which the OMM virtual machine belongs, sent by a deployment engine, or receiving an input quantity and specification of the service virtual machines created in the application software to which the OMM virtual machine belongs.

7. A non-transitory computer readable storage medium, wherein the storage medium comprises one or more instructions, and when the one or more instructions are run on a processor, the method according to claim 1 is implemented.

8. An operation and maintenance management (OMM) virtual machine, wherein the OMM virtual machine comprises a processing unit, and
the processing unit is configured to:
obtain, based on information received from respective service virtual machines created in virtual network function application software to which the OMM virtual machine belongs, a quantity and a specification of said service virtual machines, wherein a specification of a service virtual machine indicates at least CPU information, memory information and hard disk information associated with the service virtual machine; and
determine, based on a load to be carried by the application software and the quantity and the specification of the service virtual machines, a plurality of modules to be configured for each of the service virtual machines, wherein the determining comprises:
determining, based on the load, a type of the module of each of the plurality of modules and a total quantity of modules of each type; and
configuring, based on the quantity and the specification of the service virtual machines, the total quantity of modules of each type for each of the service virtual machines.

9. The OMM virtual machine according to claim 8, wherein resources occupied when all modules configured for a target service virtual machine run do not exceed resources represented by a specification of the target service virtual machine, and the target service virtual machine is any one of the service virtual machines.

10. The OMM virtual machine according to claim 8, wherein a difference between the resources represented by the specification of the target service virtual machine and the resources occupied when all the modules configured for the target service virtual machine run is not greater than a first preset threshold.

11. The OMM virtual machine according to claim 8, wherein the quantity and the specification of the service virtual machines are obtained based on a virtual machine specification supported by a cloud infrastructure system and the load; and a specification of each service virtual machine is the same as the virtual machine specification supported by the cloud infrastructure system.

12. The OMM virtual machine according to claim 11, wherein the cloud infrastructure system supports a plurality of virtual machine specifications, and a virtual machine of each specification has a corresponding cost; and when all the service virtual machines can carry the load, a total cost of all the service virtual machines is lowest or a quantity of virtual machine specifications of all the service virtual machines is less than a second preset threshold.

13. The OMM virtual machine according to claim 8, wherein the processing unit is further configured to
receive the quantity and the specification of service virtual machines created in the application software to which the OMM virtual machine belongs, sent by a deployment engine, or receiving an input quantity and specification of the service virtual machines created in the application software to which the OMM virtual machine belongs.

* * * * *